(12) United States Patent
Matsuoka

(10) Patent No.: US 12,488,475 B2
(45) Date of Patent: Dec. 2, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Keisuke Matsuoka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 326 days.

(21) Appl. No.: 18/310,112

(22) Filed: May 1, 2023

(65) Prior Publication Data
US 2023/0377169 A1 Nov. 23, 2023

(30) Foreign Application Priority Data
May 18, 2022 (JP) .................................. 2022-081247

(51) Int. Cl.
G06T 7/20 (2017.01)
G06T 7/70 (2017.01)
(Continued)

(52) U.S. Cl.
CPC .................. G06T 7/20 (2013.01); G06T 7/70 (2017.01); *G06T 2207/10016* (2013.01);
(Continued)

(58) Field of Classification Search
CPC ... G06T 7/20; G06T 7/70; G06T 2207/10016; G06T 2207/30196; G06T 2207/10021;
(Continued)

(56) References Cited

U.S. PATENT DOCUMENTS

2011/0134240 A1* 6/2011 Anderson ............... H04W 4/38
348/143

FOREIGN PATENT DOCUMENTS

JP 2020-096262 A 6/2020

* cited by examiner

Primary Examiner — Stephen P Coleman
(74) Attorney, Agent, or Firm — Cowan, Liebowitz & Latman, P.C.

(57) ABSTRACT

An image processing apparatus comprising: a first identifying unit configured to identify the position of an object that is a tracking target based on an image obtained by an imaging unit; a second identifying unit configured to identify the position of the object based on radio waves received from a wireless device that the object holds; a first determination unit configured to determine whether or not the object overlaps with another object in the image obtained by the imaging unit; a second determination unit configured to determine whether or not a distance between the object and the another object in the image obtained by the imaging unit has been separated by a predetermined distance or more; and a tracking unit configured to perform tracking of the object based on the position of the object identified by the first identifying unit, wherein if the first identifying unit determines that the object overlaps with the another object in the image obtained by the imaging unit, and then if the second identifying unit determines that the distance between the object and the another object has been separated by a predetermined distance or more in the image obtained by the imaging unit, the tracking unit performs tracking of the object based on the position of the object identified by the second identification unit.

8 Claims, 7 Drawing Sheets

(51) Int. Cl.
*H04N 23/611* (2023.01)
*H04N 23/661* (2023.01)
*H04N 23/69* (2023.01)
*H04N 23/695* (2023.01)

(52) U.S. Cl.
CPC .. *G06T 2207/30196* (2013.01); *H04N 23/611* (2023.01); *H04N 23/661* (2023.01); *H04N 23/69* (2023.01); *H04N 23/695* (2023.01)

(58) Field of Classification Search
CPC ........... G06T 2207/10028; G06T 2207/30201; H04N 23/611; H04N 23/661; H04N 23/69; H04N 23/695
USPC ......................................................... 382/103
See application file for complete search history.

IMAGE PROCESSING APPARATUS, IMAGE PROCESSING METHOD, AND STORAGE MEDIUM

BACKGROUND OF THE INVENTION

Field of the Invention

The present disclosure relates to an image processing apparatus, an image processing method, a storage medium, and the like.

Description of the Related Art

Network cameras that execute pan tilt zoom control (hereinafter, referred to as "PTZ control") are known. Some network cameras of this type have an automatic tracking function that changes an image capturing direction according to the position of an object so that the object can be captured continuously within a screen.

While video analysis such as human body detection is typically used to identify the position of a person, there are some scenes in which it is difficult to identify this position (scenes for which the reliability of position identification is low) due to its characteristics. For example, there are cases in which a feature amount that matches the data learned in advance cannot be extracted from an object due to a change in the color of the peripheral light due to lighting variation or a change in the state of the orientation and attitude of the object, or the like.

Even in such a case, a desired object to be tracked (hereinafter, referred to as a "tracking object") can normally be tracked by tracking processing in which the detection results of each frame are interpolated between frames.

However, when the tracking object overlaps with another person, it becomes difficult to determine which detection result corresponds to the results for the tracking object. That is, erroneous tracking, in which a person A should have been tracked but a different person B is tracked, is likely to occur. When erroneous tracking occurs, the image capturing direction is changed according to the position of a person that is different from the tracking object, which increases the possibility that the original tracking object is out of the imaging range.

Japanese Patent Application Laid-Open Publication No. 2020-96262 discloses that an object that has intersected a tracking object or an object that is separated from a tracking object is registered as a tracking candidate object, and when it is determined that the tracking object is not an identified object, the imaging direction is changed according to the position of the tracking candidate object.

In Japanese Patent Application Laid-Open Publication No. 2020-96262, when it is determined that a tracking object is not a designated object, a tracking candidate object with a high degree of similarity to the tracking object is selected as the tracking object, and consequently, the imaging direction can be changed immediately toward the original position of the tracking object.

However, when there is a plurality of persons who have a similar feature amount to the tracking object, for example, when the tracking object overlaps with a person wearing similar clothes, there is no difference in the degree of similarity, so the tracking candidate object selected as the tracking object does not necessarily become a desired object. Additionally, under environments with lighting variation, low-light environments, or the like, the feature quantity of each tracking candidate object cannot be extracted stably, and errors in the degree of similarity to the tracking object increase, and the same drawback still exists.

One object of the present disclosure is providing an image processing apparatus capable of tracking a tracking target even when the reliability in position identification decreases during identification of the position of an object based on an image.

SUMMARY OF THE INVENTION

An image processing apparatus in one aspect of the present invention comprises: at least one processor or circuit configured to function as: a first identifying unit configured to identify the position of an object that is a tracking target based on an image obtained by an imaging unit; a second identifying unit configured to identify the position of the object based on radio waves received from a wireless device that the object holds; a first determination unit configured to determine whether or not the object overlaps with another object in the image obtained by the imaging unit; a second determination unit configured to determine whether or not the distance between the object and the another object in the image obtained by the imaging unit has been separated by a predetermined distance or more; and a tracking unit configured to perform tracking of the object based on the position of the object identified by the first identifying unit, wherein if the first identifying unit determines that the object overlaps with the another object in the image obtained by the imaging unit, and then if the second identifying unit determines that a distance between the object and the another object has been separated by a predetermined distance or more in the image obtained by the imaging unit, the tracking unit performs tracking of the object based on the position of the object identified by the second identification unit.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

Figure 1:
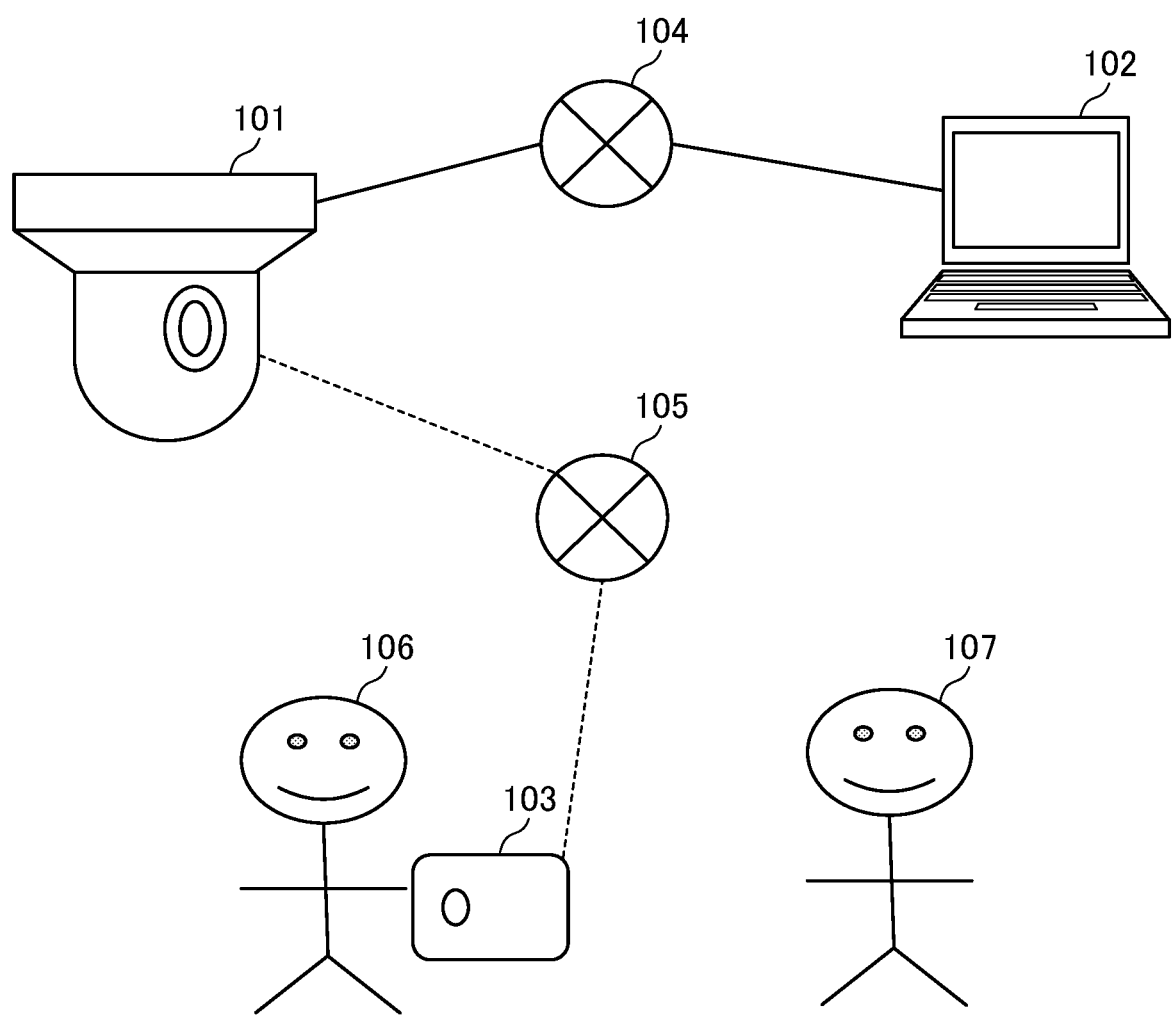
FIG. 1 is a diagram showing an example of a configuration of a network system 100 according to the embodiment of the present invention.

FIG. 1 is a diagram showing an example of a configuration of a network system 100 according to the embodiment of the present invention. The network system 100 includes the network camera 101, a client device 102, a wireless device 103, a network 104, and a wireless network 105.

In the network camera 101, video image distribution and camera control through a wired or wireless network is possible. The network camera 101 functions as an imaging device.

The client device 102 is connected to the network camera 101 via the network 104. The client device 102 controls the network camera 101 and displays information via a browser.

The wireless device 103 is connected to the network camera 101 via the wireless network 105. The wireless device 103 incorporates, for example, a wireless communication module conforming to the Bluetooth (registered trademark) 5.1 specification. The wireless device 103 is held by the object 106 imaged by the network camera 101.

The object 106 is, for example, a person, and the object 106 holds the wireless device 103. The wireless device 103 is used to identify the position of the object 106 with the network camera 101, as will be described below.

In contrast, it is assumed that an object 107, which is a person who is not holding the wireless device 103, is within an image capturing range of the network camera 101, in the same manner as the object 106. Note that the object is not limited to a person. The object 107 includes living things such as animals and moving objects such as automobiles and robots.

The network 104 is used to distribute video images captured by the network camera 101 to an external recording server and the like, and enables intercommunication between the network camera 101 and the client device 102. Although, in the present embodiment, the communication form of the network 104 is a wired LAN, it may be a wireless LAN.

The network camera 101 intercommunicates with the wireless device 103 via a wireless network 105 such as Bluetooth (registered trademark). The wireless network 105 may conform to wireless communication standards such as Z-Wave (registered trademark), Zigbee (registered trademark), and UWB (Ultra Wide Band).

Figure 2:
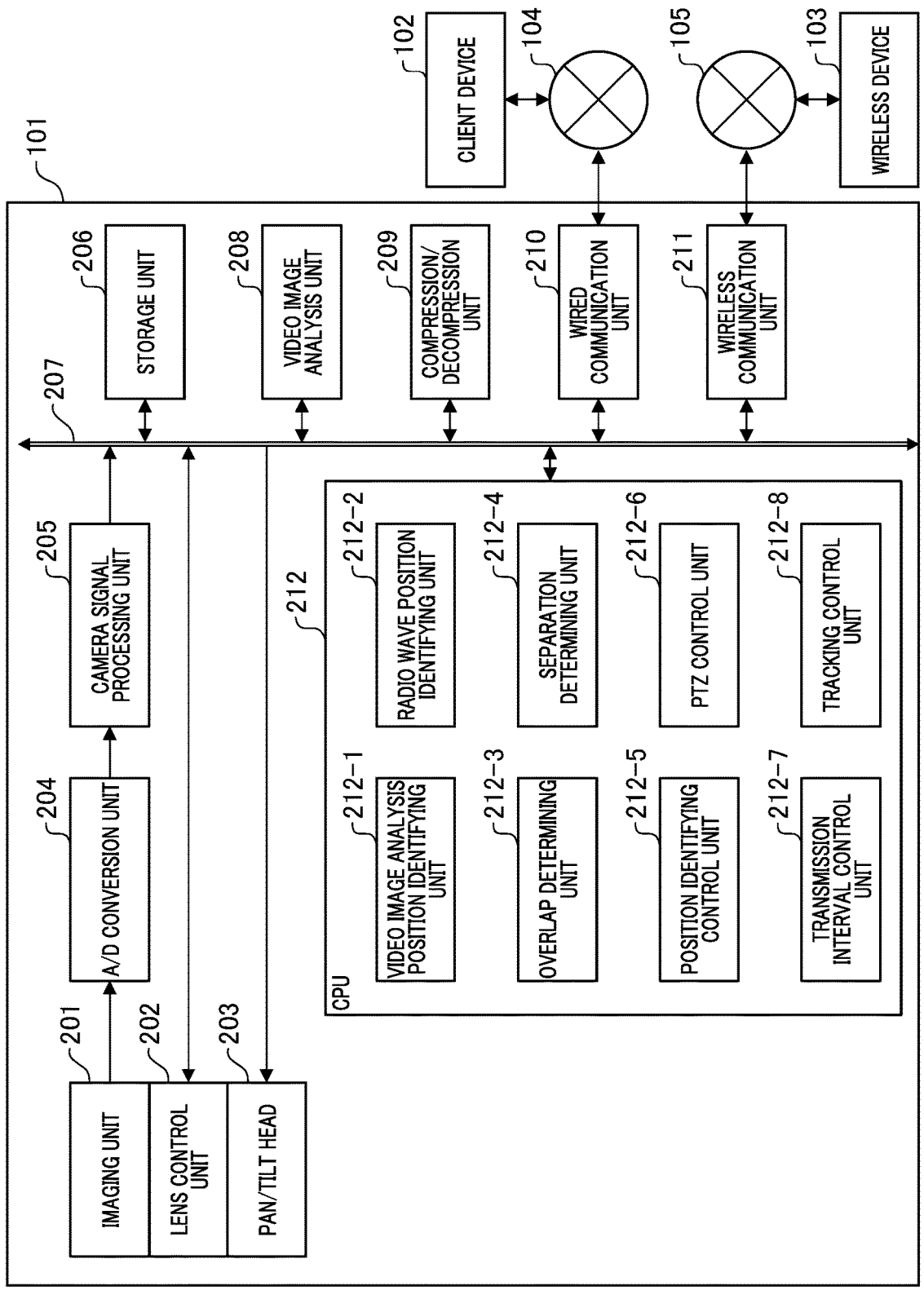
FIG. 2 is a functional block diagram showing an example of a configuration of a network camera 101 according to the embodiment.

FIG. 2 is a functional block diagram showing a configuration example of the network camera 101 according to the embodiment. Note that a part of the functional blocks shown in FIG. 2 may be realized by causing a CPU serving as a computer included in the network camera 101 to execute a computer program that is stored in a storage unit that serves as a storage medium.

However, a part or all of these may be realized by hardware. A dedicated circuit (ASIC), a processor (reconfigurable processor, DSP), and the like can be used as hardware.

Additionally, each functional block shown in FIG. 2 is not necessarily built into the same housing and may be configured by separate devices that are connected to each other via a signal line.

The network camera 101 has an imaging unit 201, a lens control unit 202, and a pan/tilt head 203.

The network camera 101 also has an A/D conversion unit 204, a camera signal processing unit 205, a storage unit 206, a bus 207, a video image analysis unit 208, a compression/decompression unit 209, a wired communication unit 210, the wireless communication unit 211, and a CPU 212. The CPU 212 is a central processing unit serving as a computer.

The imaging unit 201 has a zoom lens, a focus lens, an aperture, and imaging elements such as a CMOS image sensor. The lens control unit 202 performs control so as to move the zoom lens and the focus lens along the optical axis and to operate the diaphragm.

In the imaging unit 201, the imaging element photoelectrically converts light that has passed through the zoom lens, the focus lens, and the diaphragm and generates analog image signals. The imaging unit 201 outputs analog image signals generated by the imaging device to the A/D conversion unit 204 after performing the amplification processing by sampling.

The pan/tilt head 203 has a pan drive part and a tilt drive part. The CPU 212 controls the pan/tilt head 203 via an actuator (not illustrated) to perform pan and tilt drive (hereinafter, referred to as "PT drive") by which the imaging unit 201 is rotated in the horizontal and vertical directions, and the image capturing direction can thereby be changed. Note that the pan/tilt head 203 may also have just one of the pan drive part and the tilt drive part.

The A/D conversion unit 204 converts the analog image signals into digital image signals and supplies the digital image signals to the camera processing unit 205. The camera signal processing unit 205 performs various image processing on the digital image signals that have been converted by the A/D conversion unit 204 and generates video image signals. Various image processing includes, for example, offset processing, gamma correction processing, gain processing, RGB interpolation processing, noise reduction processing, color tone correction processing, and the like.

The storage unit 206 is configured by a RAM, a ROM, a storage device, and the like. The RAM is a volatile memory, for example, a SRAM and a DRAM. The ROM is a non-volatile memory, for example, an EEPROM and a flash memory.

Examples of the storage devices include an HDD (Hard Disk Drive), an SSD (Solid State Drive), and the like. A computer program for realizing the functions described in the present embodiment and the data used when the program is executed are stored in a ROM or a storage device.

Figure 6:
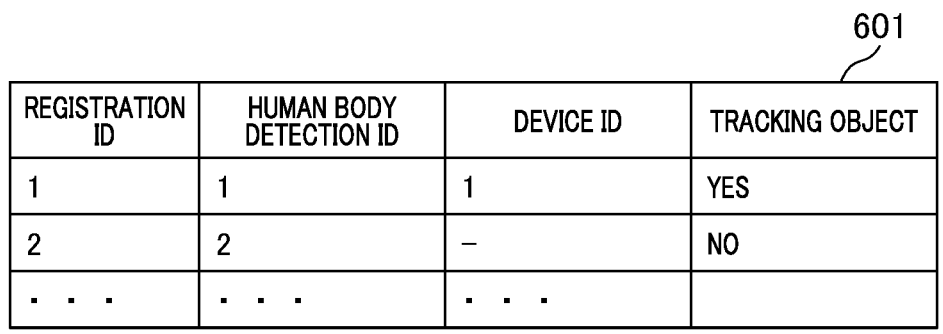
FIG. 6 is a diagram showing an example of a table that associates an object 106 and the wireless device 103.

For example, table information indicating that, for example, the object 106 that is a tracking target (tracking object) holds (possesses) the wireless device 103, which will be described below in FIG. 6, is also stored. These programs and data are appropriately loaded into a RAM via the bus 207, executed by the CPU 212, and function as each functional block.

The video image analysis unit 208 analyzes video image signals and performs various detection processing such as human body detection, face detection, and moving body detection. Although, for example, one example of video image analysis for identifying the position of the object 106 or the object 107 is human body detection for detecting a human body within an image frame, face detection or moving body detection may also be used depending on the use scene. The video image analysis unit 208 outputs the video image analysis result to the CPU 212 via the bus 207.

The compression/decompression unit 209 performs compression processing on the video image signals and generates compressed data. The wired communication unit 210 performs network communication processing to and from the client device 102 via the network 104.

The wireless communication unit 211 performs wireless communication processing to and from the wireless device 103 via the wireless network 105. Although, in the present embodiment, the wireless communication unit 211 includes a wireless communication module conforming to the Bluetooth (registered trademark) 5.1 specification, the present invention is not limited thereto. For example, in the wireless communication unit 211, an external wireless communication module may be connected via a general-purpose interface such as USB.

The CPU 212 serving as a computer functions as a control unit that controls the operation of each unit of the entire device including the network camera 101 based on the computer program stored in the storage unit 206 serving as a storage medium.

The CPU 212 functions as a video image analysis position identifying unit 212-1, a radio wave position identifying unit 212-2, an overlap determining unit 212-3, a separation determining unit 212-4, a position identifying control unit 212-5, a PTZ control unit 212-6, a transmission interval control unit 212-7, and a tracking control unit 212-8.

The video image analysis position identifying unit 212-1 identifies the position of the object 106 or the object 107 within the image frame based on the human body detection result obtained by the video analysis unit 208 (hereinafter, referred to as "position identification"). Here, the video image analysis position identifying unit 212-1 functions as a first identifying unit that identifies the position of the object based on the image obtained by the imaging unit.

The radio wave position identifying unit 212-2 determines relative position of the wireless device 103 as viewed from the network camera 101, in other words, the relative position of the object 106 having the wireless device 103, based on the flying direction of radio waves received from the wireless device 103 (hereinafter, referred to as the "radio wave direction").

Here, the radio wave position identification unit 212-2 functions as a second identification unit that identifies the position of the object, based on the radio waves received from the wireless device that the object holds when a state is detected in which the reliability of the position identification performed by the first identification unit is low.

The method for identifying the position of the object 106 in the radio wave position identifying unit 212-2 is performed based on, for example, the direction detection function of wireless communication conforming to the Bluetooth (registered trademark) 5.1 specification and the details thereof will be explained below with reference to FIG. 3.

The overlap determining unit 212-3 determines whether or not the position of the object 106 identified by the video image analysis position identifying unit 212-1 overlaps with another object that is different from the object 106. In the present embodiment, for example, whether or not the object 106 and the object 107 overlap is determined, and in the determination method, it is determined that an overlap occurs when at least some of the rectangular coordinates of each human body frame overlap as a result of the body detection processing. However, it is not limited thereto.

It may also be determined that an overlap occurs, for example, when the distance between the human body frames falls within a predetermined distance, or it may also be determined that an overlap occurs, for example, when the object 107 overlaps within a rectangular range of a predetermined size that is approximately centered around the object 106. Additionally, the overlap determination is not dependent on the length of time, and it is determined that an overlap has occurred even if this overlap occurred for a short period time. For example, it is determined that an overlap occurred even if the objects intersect for only a moment.

After the overlap determining unit 212-3 determines that an overlap has occurred, the separation determining unit 212-4 determines whether or not a plurality of persons including the object 106 has been separated. Although in the determination method in the present embodiment, it is determined that the persons have been separated when the distance between the object 106 and the object 107 is a predetermined distance or more as a result of the human body detection processing, the present invention is not limited thereto. For example, if at least two or more persons appear in a rectangular region with a predetermined size where an overlap occurs, it may be determined that the persons have been separated.

The position identifying control unit 212-5 controls the execution of the video image analysis position identifying unit 212-1 and the radio wave position identifying unit 212-2. In the present embodiment, the accuracy of the position of the object 106 obtained by the radio wave position identifying unit 212-2 is lower than the accuracy of the position of the object 106 obtained by the video image analysis position identifying unit 212-1.

The details will be described with reference to FIG. 3, and in the principle of detecting the direction of radio waves, as the distance between the antennas provided on the receiving device side increases, the accuracy can be improved, however, the physical size on the receiving device side increases due to the increase in distance.

Since there are practical restrictions on the distance between antennas, the accuracy is lower than the accuracy for the position captured by video image analysis. Accordingly, in the present embodiment, the position identifying control unit 212-5 maintains the accuracy by performing tracking based on video image analysis as long as the position of the object 106 can be identified by the video image analysis position identifying unit 212-1.

The PTZ control unit 212-6 performs the pan, tilt, or zoom drive (hereinafter, referred to as "PTZ drive") based on the position of the object 106 that has been acquired by the position identification performed by the video image analysis position identification unit 212-1 or the radio wave position identification unit 212-2. Note that the zoom drive may be performed if necessary, and the PTZ drive includes at least one of pan drive or tilt drive.

A PTZ control unit 212-6 controls the PTZ drive by using the lens control unit 202 and the pan/tilt head 203. Then, the PTZ control section 212-6 controls the PTZ drive so that the image capturing direction of the network camera 101 is directed to the position of the object 106, thereby enabling automatic tracking of the object 106.

The transmission interval control unit 212-7 transmits instruction data indicating the transmission interval to the wireless device 103, and accordingly the wireless device 103 changes the transmission interval of radio waves to the network camera 101. If the transmission interval is shortened, the position of the object 106 can be identified by the network camera 101, so that tracking is possible even if the object 106 is moving at a high speed, however, the battery consumption of the wireless device 103 becomes severe.

In contrast, if the transmission interval is prolonged, the battery consumption in the wireless device 103 can be reduced, however, the interval for identifying the position of the object 106 becomes longer, and as a result, it becomes difficult to identify the position of the object 106.

The tracking control unit 212-8 performs the control of the overall processing for the automatic tracking. Specifically, it performs the control of the start and end of the automatic tracking processing, initial setting, and the like.

Note that the tracking control unit 212-8 functions as a tracking unit that performs tracking of the object based on the position identified by the first and second identifying units, and performs pan or tilt control for changing the direction of the imaging unit.

Figure 3:
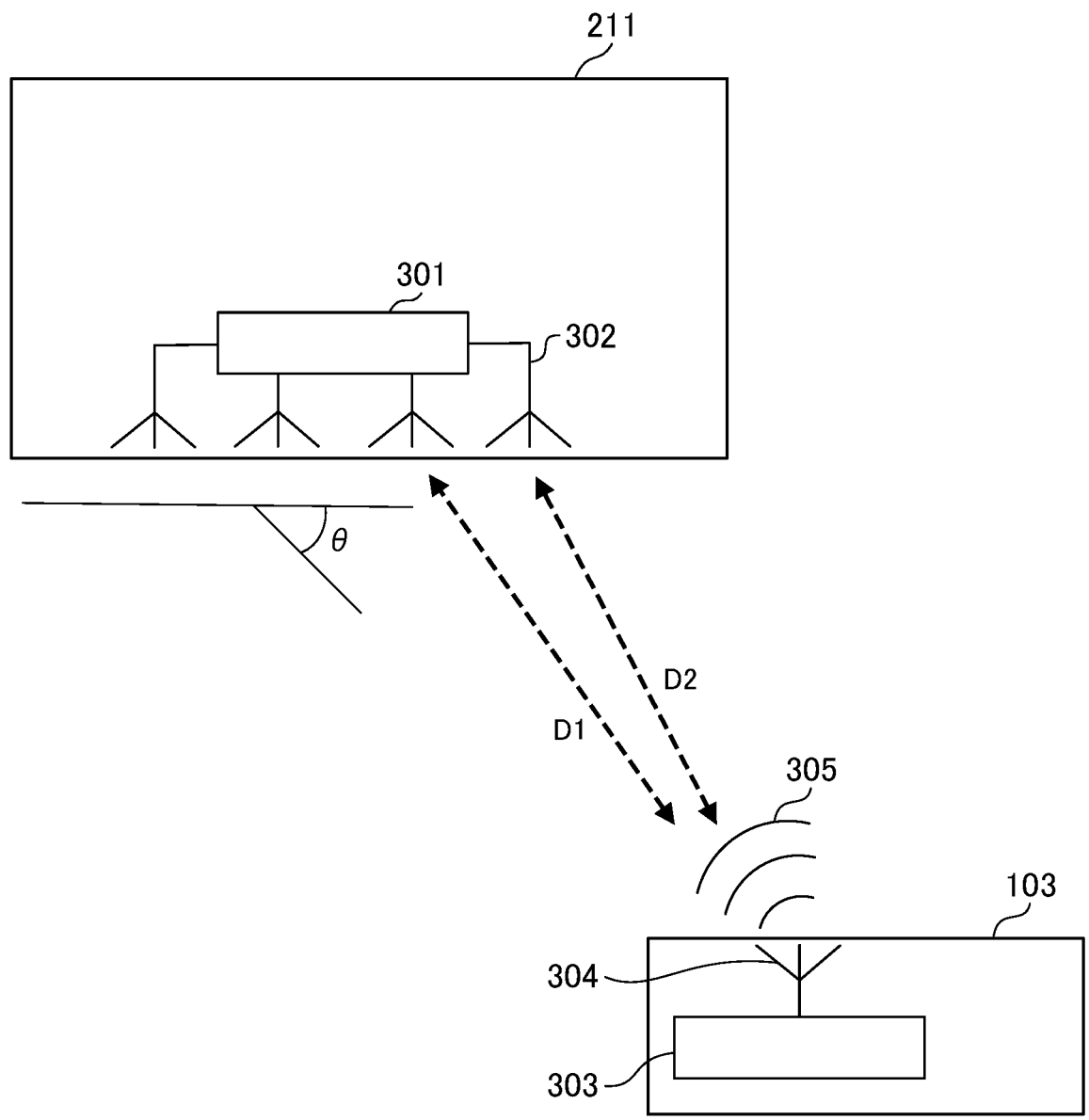
FIG. 3 is a diagram for explaining the principle of the radio communication unit 211 according to the embodiment detecting the direction of radio waves from a wireless device 103.

FIG. 3 is a diagram for explaining the principle for the wireless communication unit 211 according to the embodiment to detect the radio direction from the wireless device 103. The wireless communication unit 211 of the network camera 101 in the present embodiment has a wireless communication direction detection function conforming to the Bluetooth (registered trademark) 5.1 specification.

Then, the wireless communication unit 211 detects the radio wave direction by using an antenna array having a plurality of antennas 302 and utilizing the phase difference in radio waves caused by the antennas 302 being located in different positions.

There are two methods for detecting the radio wave direction, as explained below. The first method is referred to as "Angle of Arrival (AoA)", in which the reception angle of radio waves is calculated on the receiving device side. The second method is referred to as "Angle of Departure (AoD)", in which the emission angle is calculated on the transmitting device side and it is transmitted to the receiving device.

In the present embodiment, the wireless device 103 is a transmitting device, the wireless communication unit 211 is a receiving device, and the wireless communication unit 211 performs direction detection using AoA. However, AoD may also be used.

As shown in FIG. 3, the wireless communication unit 211, which is a receiving device, has a receiver 301 and the plurality of antennas 302 arranged at regular intervals. Additionally, the wireless device 103, which is a transmitting device, has a transmitter 303 and a single antenna 304. The wireless device 103 transmits radio waves 305 including predetermined direction detection signals from the antenna 304 by the transmitter 303, and the wireless communication unit 211 receives the radio waves 305 by the plurality of antennas 302.

At this time, although the plurality of antennas 302 arranged at equal intervals each receive the radio waves 305, the distances between the antenna 304 and each of the plurality of antennas 302 are different as shown by the distance D1 and the distance D2, so that signals with different phases can be detected for each antenna 302.

Then, the radio position identification unit 212-2 acquires modulation signals (IQ modulation signals) that have an in-phase component and a quadrature phase component, which are phase information of the radio waves, while switching the active antenna in the wireless communication unit 211. Furthermore, the incident angle θ, which is the relative direction of the signals, is calculated, based on the IQ modulated signals.

Although the calculation of the incident angle θ is performed using the wavelength of the radio wave, the distance between the antennas and the phase difference, this method is well known, and therefore, explanations thereof will be omitted. Then, the network camera 101 can obtain in advance the current orientation (image capturing direction) of the network camera 101 in the three-dimensional space by calibration performed during the installation.

Note that when the network camera 101 is not fixed, for example, when the network camera 101 is provided on a moving object, the orientation of the network camera 101 (image capturing direction) may be obtained in advance using an encoder, an electronic compass, a GPS or the like that detects the tilt angle.

By the method described above, the radio position identification unit 212-2 of the network camera 101 can identify the relative position of the wireless device 103 as viewed from the network camera 101, based on the radio wave direction from the wireless device 103 via the wireless communication unit 211.

Figure 4:
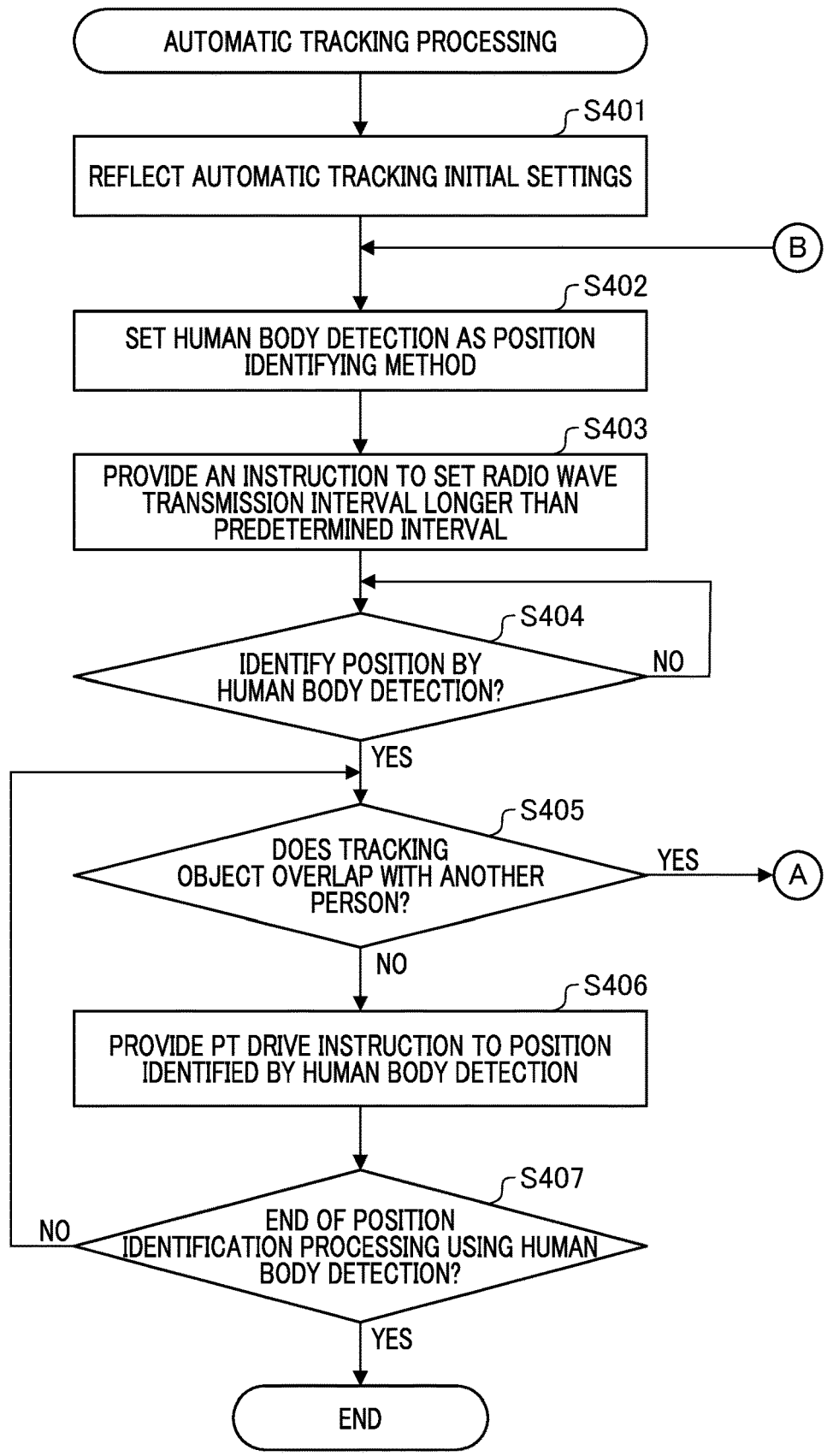
FIG. 4 is a flow chart showing the flow of automatic tracking processing of the network camera 101 according to the embodiment.
Figure 5:
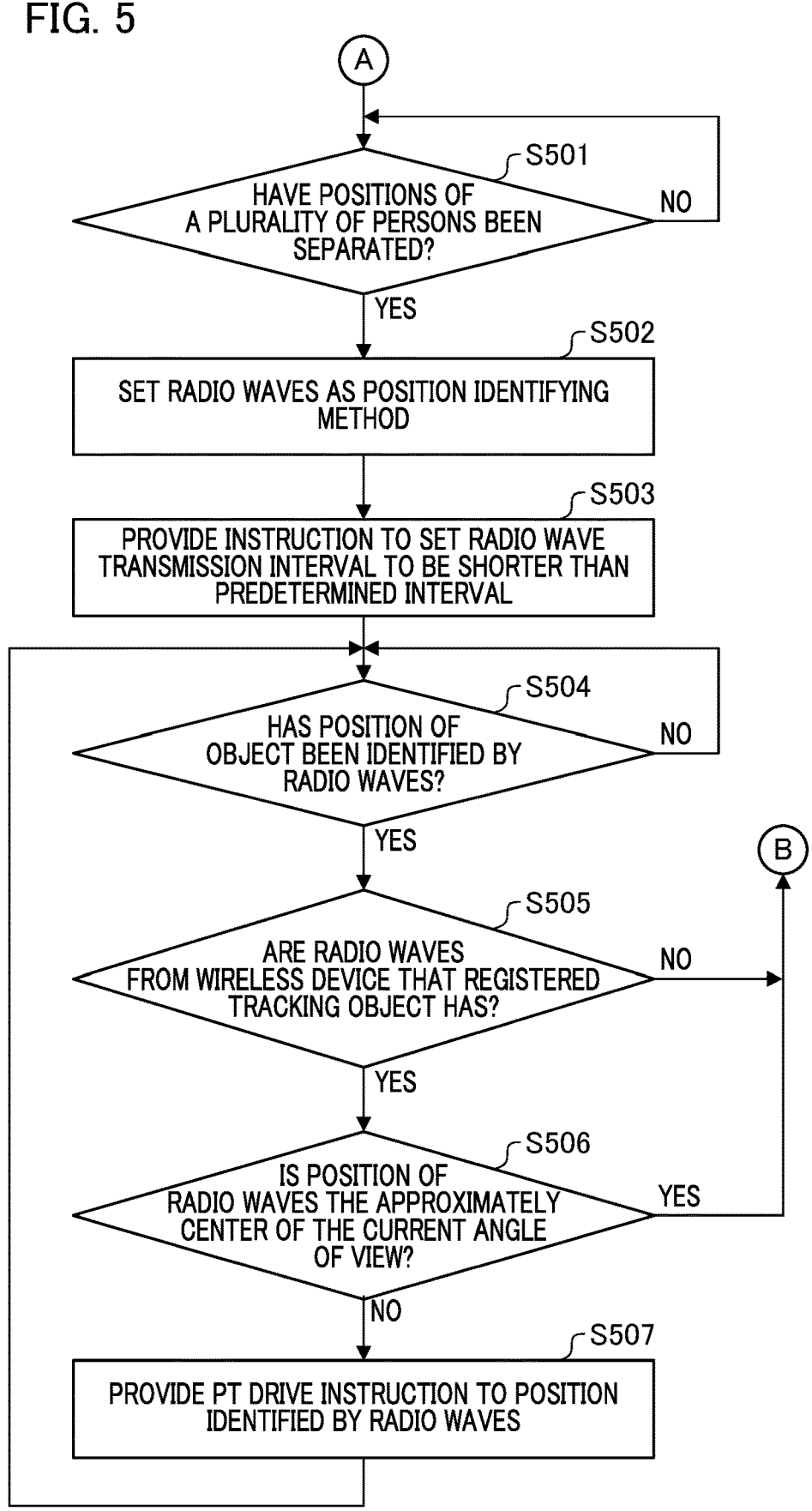
FIG. 5 is a flowchart showing the continuation of FIG. 4.

FIG. 4 is a flow chart showing the flow of automatic tracking processing of the network camera 101 according to the present embodiment, and FIG. 5 is a flow chart showing the continuation in FIG. 4. Note that operation of each step of the flowchart in FIG. 4 and FIG. 5 is performed by the CPU 212 serving as a computer executing the computer program stored in the storage unit. A control method for the network camera 101 will be described below.

In step S401, the tracking control unit 212-8 reflects the initial settings related to the operation of the automatic tracking processing. The contents to be reflected include the association between the object 106 and the wireless device 103, the setting of the object 106 as the tracking object, and the like.

Here, FIG. 6 is a diagram showing one example of a table that associates the object 106 and the wireless device 103. In FIG. 6, reference numeral 601 denotes a management table in which a detection ID for identifying a human body in a human body detection result, a device ID for identifying a wireless device 103, and a flag for whether or not the object is a tracking object are associated with each other and stored with a registration ID in a storage unit 206.

In the subsequent steps, a description will be given by assuming that the registered ID1 that associates with the human body detection ID1 of the object 106 and the device ID1 of the wireless device 103 is used.

Note that, in the present embodiment, although the association as a tracking object having the wireless device 103 is performed by selecting the human body frame of the object 106 from the client device 102 by user operation, the present invention is not limited thereto.

The association may be performed by preparing a dedicated mode for performing an association determined in advance, and during that mode, placing the object 106 in a predetermined position within the angle of view, or the association may be performed by recognizing a predetermined gesture operation of the object 106.

In step S402, the position identifying control unit 212-5 performs settings so that human body detection is used as the position identifying method. Here, step S402 functions as a first identifying step for identifying the position of the object based on an image obtained by an imaging unit.

In step S403, the transmission interval control unit 212-7 instructs the wireless device 103 to set the transmission interval of radio waves from the wireless device 103 to be longer than a predetermined interval. Consequently, the battery consumption in the wireless device 103 can be reduced.

In step S404, the video image analysis position identifying unit 212-1 acquires the human body detection result in the video image analysis unit 208, and determines whether or not the position of the object 106 has been identified. If the position of the object 106 has been identified, the process proceeds to step S405, and if not, the process returns to step S404.

In step S405, the overlap determining unit 212-3 determines whether or not the object 106, which is a tracking object, overlaps with another person. If it is determined that no overlap is occurring, the process proceeds to step S406. If it is determined that an overlap is occurring, the process proceeds to step S501.

Here, step S405 functions as a step for detecting whether or not the reliability of the position identification performed by the first identification unit is low.

Specifically, since it is determined that the reliability of the position identification performed by the first identifying unit is low when the object 106, which is a tracking object, overlaps with another person, this step functions as a step for detecting such a state.

Note that, although in the present embodiment, the state in which the object 106, which is a tracking object, overlaps with another person is detected (determined) as a state in which the reliability of the position identification performed by the first identification unit is low, the present invention is not limited thereto.

It may be detected (determined) that the reliability of the position identification performed by the first specific unit is low by determining, for example, the case in which the contrast of the object is lower than a predetermined value, the case in which the brightness of the object is not within a predetermined proper range, or the combined state thereof.

In step S406, the PTZ control unit 212-6 provides an instruction for PT drive (pan drive and/or tilt drive) of the network camera 101 toward the position of the object 106 identified in step S404. That is, when a state in which the reliability of the position identification performed by the first identifying unit is low is not detected ("NO" in step S405), the object tracking is performed based on the position that has been identified by the first identifying unit.

Here, the image capturing direction of the network camera 101 is changed so that the object 106 is displayed at the central position within the angle of view. Specifically, the PTZ control unit 212-6 obtains a drive amount in the pan direction and/or the tilt direction and outputs an instruction for PT drive. However, methods for determining a driving quantity are publicly known, and explanations thereof will be omitted.

Note that, although in the flow in FIG. 4, the explanation is given for driving in the pan and/or tilt direction, the present invention is not limited thereto. For example, the PTZ control unit 212-6 may estimate a distance to the object 106 according to the size of the human body frame obtained as a result of human body detection, and the zoom may be controlled as necessary.

Alternatively, the distance to the object may be measured using, for example, a stereo camera, a DAF (Dual Pixel Auto Focus) imaging device, a TOF (Time Of Flight) sensor, and the like, and the zoom may be controlled as necessary. Alternatively, measurement may be performed using a UWB communication system with high ranging accuracy, and the zoom may be controlled as necessary.

In step S407, the tracking control unit 212-8 determines whether or not an instruction for ending the position identifying processing using human body detection has been provided. The end instruction is based on an explicit instruction from the client device 102, and if there is an end instruction, the flow shown in FIG. 4 ends, and if there is no instruction, the process returns to step S405. Accordingly, when the object 106 does not overlap with another object, for example, another person, the automatic tracking processing can be continued with low risk of erroneous tracking.

Note that although in the present embodiment, the explanation is given as the end instruction being determined after step S406, the present invention is not limited thereto. If there is an explicit end instruction from the user at any timing, a transition may be carried out to end the flowchart in FIG. 4.

When the determination is "YES" in step S405 in FIG. 4, the separation determining unit 212-4 determines, in step S501 in FIG. 5, whether or not the positions of a plurality of persons including the object 106 have been separated. That is, the overlap determining unit 212-3 determines whether or not the object 106 and the object 107 are separated by a predetermined distance or more within the screen after the object 106 and the object 107 have overlapped.

If it is determined that the objects have separated, the process proceeds to step S502. If it is determined that the objects have not separated, the process returns to step S501. Thus, in the present embodiment, a state in which an object overlaps with another object and then the objects are separated from each other by a predetermined distance or more within the image is detected (determined), which is a state in which the reliability of the position identification performed by the first identification unit is low.

Note that the predetermined distance within the screen for performing the determination in step S501 is changed according to the detection accuracy when the position is identified by radio waves. That is, as the detection accuracy is lower during the identification of a position by radio waves, the predetermined distance within the screen is set to be longer.

Additionally, as the zoom is increased or the distance from the network camera 101 to the object becomes longer, the above distance within the screen is set to be longer. That is, the predetermined distance is changed according to at least one of a zoom state of the imaging unit or a distance from the imaging unit to the object.

In step S502, the position identifying control unit 212-5 performs settings so that radio waves are used as a position identifying method, and causes PT control (pan control and/or tilt control) so that the imaging unit is directed toward the position identified by the radio wave position identifying unit. At this time, although the human body detection processing is not provided for the purpose of position identification for PT control, the detection processing continues.

Here, step S502 functions as a second identification step for identifying the position of the object, based on the radio waves received from the wireless device that the object holds when a state in which the reliability of the position identification performed by the first identification step is low is detected.

In step S503, the transmission interval control unit 212-7 instructs the wireless device 103 to set the transmission interval of the radio waves from the wireless device 103 to be shorter than a predetermined interval. Accordingly, the network camera 101 can thoroughly identify the position of the object 106 in a short cycle even if the object 106 is moving at a high speed.

In step S504, the radio wave position identifying unit 212-2 acquires radio wave signals from the wireless device 103 by the wireless communication unit 211, and determines whether or not the position of the object 106 has been identified based on the radio wave direction. If the position of the object 106 has been identified, the process proceeds to step S505, and if not, the process returns to step S504.

In step S505, the tracking control unit 212-8 refers to the management table set in step S401. Then, it is determined whether or not the device ID of the wireless device that has emitted the radio waves acquired during the identification of the position in step S504 is associated with the human body detection ID that has been registered in advance.

That is, in step S505, whether or not to track the object based on the position identified by the second identifying unit is controlled based on the management table in which the identification information of the object (human body detection ID) and the identification information of the wireless device (device ID) are associated.

If it is determined that the radio waves are from the wireless device with the device ID associated with the registered tracking object, the process proceeds to step S506. In contrast, if it is determined that the radio waves are not from the associated wireless device, the process returns to step S402 in FIG. 4.

When radio waves are consequently received from a wireless device held by a tracking object that has been registered in advance, if necessary, PT drive is performed according to the position identified by the radio waves during the processes following step S506.

In contrast, in the case in which it is determined in step S505 that the wireless device that emits radio waves is not held by the tracking object, since matching the position of the received radio waves causes erroneous tracking, the process returns to step S402. Then, PT control is performed so that the imaging unit is directed to the position identified based on human body detection.

Note that, in that case, since erroneous tracking may occur if, in step S402, the position is identified based on human body detection, the process may return to step S402 and an alert, for example, "There is a possibility that erroneous tracking occurs" may be provided to the user. Alternatively, the color of the tracking frame may be changed to red or yellow to indicate an alert, instead of normally displaying the color of the tracking frame in green.

In step S506, the tracking control unit 212-8 determines whether or not the position identified in step S504 is at the approximate center of the current angle of view. If the determination is "NO", erroneous tracking occurs, and the process proceeds to step S507. If the determination is "YES", erroneous tracking will not occur and the object 106 is correctly tracked, and the process returns to step S402.

As described above, in the present embodiment, tracking an object is performed based on the position identified by the second identifying unit, and then the object tracking is performed based on the position identified by the first identifying unit. Note that, in step S506, if the position of the radio waves falls within a predetermined distance (within an allowable range) from the center of the angle of view, even if the position is not in the exact center of the angle of view, it is assumed that the tracking is properly performed, and the determination is "YES".

In step S402, the tracking of object 106 by human body detection that is performed by the video image analysis position identifying unit 212-1 restarts.

Thus, in the present embodiment, since the position of the object 106 identified based on video image analysis is more accurate than the position thereof identified based on radio waves, the position is identified by radio waves and then tracking is performed based on the video image. Furthermore, in step S403, the battery consumption in the wireless device 103 is reduced.

In contrast, if, in step S506, the determination is "NO", in step S507, the PTZ control unit 212-6 converts the position identified in step S505 into a driving amount to the pan direction and/or tilt direction in which PT control is to be performed, and outputs a PT drive instruction. Subsequently, the process returns to step S504. Note that since conversion processing is publicly known, and an explanation thereof will be omitted.

Additionally, although in the present embodiment, the explanation is given for driving in the pan direction and/or the tilt direction, the present invention is not limited thereto. For example, the PTZ control unit 212-6 may estimate a distance to the wireless device 103 according to a value of the radio wave intensity and may control the zoom as necessary.

Alternatively, as described above, the distance to the object may be measured using, for example, a stereo camera, a DAF imaging device, a TOF sensor, and a UWB communication method, and the zoom may be controlled as necessary.

That is, in the present embodiment, even if in step S405, a condition in which erroneous tracking is likely to occur because the object 106 overlaps with another person (a condition in which the reliability for identifying the position performed by the first identifying step is low) is detected, the position of the object is identified by radio waves and tracking is performed. Therefore, continuous tracking of the object can be performed stably.

FIGS. 7A to 7F are diagrams for explaining an example of transition of image frames during the automatic tracking processing in the flowcharts in FIG. 4 and FIG. 5. Note that an image frame 701 indicates an image frame imaged by the network camera 101. FIGS. 7A to 7F will be described below in association with the processing in FIG. 4 and FIG. 5.

First, a description will be given of the processing for up until a state is reached in which erroneous tracking is likely to occur during tracking using human body detection, with reference to FIG. 7A to FIG. 7C.

Figure 7A:
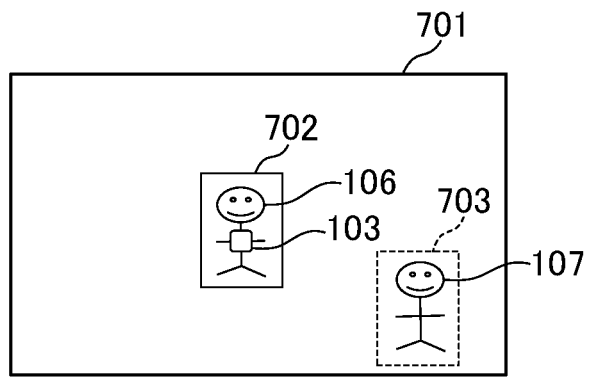
FIGS. 7A to 7F are diagrams for explaining an example of a transition between image frames during automatic tracking processing in the flowcharts in FIG. 4 and FIG. 5.

FIG. 7A shows a state in which the network camera 101 captures the detection position (detection frame) 702 of the object 106 that is a tracking target (tracking object) that holds the wireless device 103 and a detection position (detection frame) 703 of the object 107 that is not a tracking object, by using human body detection. At this point, the detection position 702 and the detection position 703 are separated by a predetermined distance or more and they do not overlap.

At this time, in step S404 in FIG. 4, the position of the object 106 is identified by human body detection, it is determined in step S405 that overlap does not occur, and, in step S406, PT drive instruction is output to the identified position, and the process returns to step S405. That is, the network camera 101 detects the object 106 by human body detection and, since the possibility of erroneous tracking is low before an overlap occurs, the network camera 101 continues automatic tracking based on human body detection.

Figure 7B:
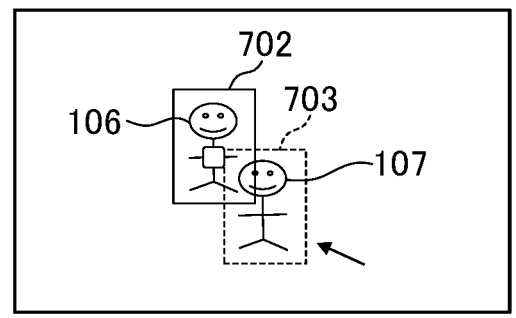

FIG. 7B is a diagram showing an example of a state in which the detected position 702 of the object 106 that is a tracking object overlaps with the detected position 703 of the object 107 that is not a tracking object. At this time, in step S405 in FIG. 4, it is determined that overlap between the object 106 that is the tracking object, and another person occurs.

In this state, it becomes difficult for the network camera 101 to stably track the object 106 that is the tracking object based on the video image, and in some cases, erroneous tracking in which the object 107 is recognized as a tracking object occurs.

Figure 7C:
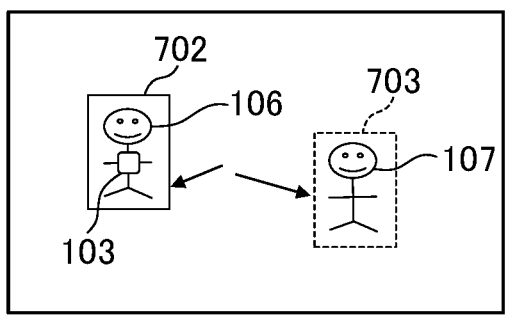

FIG. 7C is a diagram showing a state in which, in the network camera 101, the object 106 and the object 107, which are in an overlapping state in FIG. 7B, are then separated by a predetermined distance or more. When the state transitions from the state shown in FIG. 7B to the state shown in FIG. 7C, it is determined that the objects have separated into a plurality of persons in S501 in FIG. 5 after the determination is "YES" in step S405 in FIG. 4. In this state, there is a possibility that the object 106, which is the original tracking object, is not being tracked, and the object 107 is being erroneously tracked.

The processing for tracking a tracking target by using radio waves when there is a high possibility of erroneous tracking of a tracking object will be described, with reference to FIG. 7D to FIG. 7F.

Figure 7D:
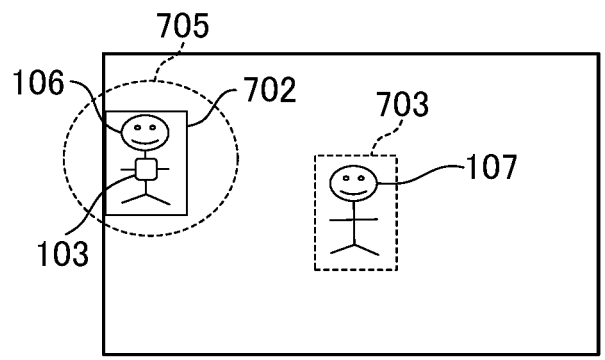

FIG. 7D shows a state in which, in steps S502 to S504, the network camera 101 acquires radio waves from the wireless device 103, identifies the radio wave direction, and captures the radio wave transmission position 705.

In FIG. 7D, the position identified based on the video image is erroneously detected, the detection position 703 of the object 107 that is not the tracking object is located at the center of the current angle of view, and the radio wave transmission position 705 is located at the periphery portions of the angle of view. In contrast, in the management table 601 in FIG. 6, it is shown that the tracking object (object 106), for which the human body detection ID is 1, is provided with the wireless device 103, for which the device ID is 1.

Therefore, if the object 106, which is the tracking object, was tracked correctly, PT control should have been performed so that the radio wave transmission position 705 is located at the approximately center of the field of view. In contrast, when the tracking target is located at the periphery of the angle of view as shown in FIG. 7D, erroneous tracking occurs, and the determination is "NO" in step S506.

Figure 7E:
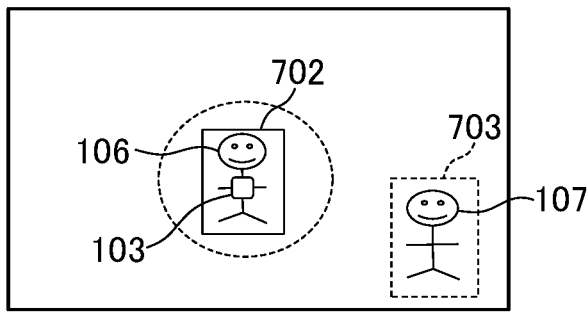

FIG. 7E shows the result of PT drive performed in the network camera 101 in step S507 so that the radio wave transmission position 705 is located at the approximate center of the angle of view, and is a diagram showing the state after erroneous tracking has been corrected.

That is, in steps S504 and S505 in FIG. 4, the position of the object 106 is identified based on the radio waves from the wireless device 103 that the object 106 holds, and if the position deviates from the center of the current angle of view by a predetermined distance or more, erroneous tracking occurs and the determination is "NO" in step S506.

In that case, in step S507, erroneous tracking can be corrected by outputting the PT drive instruction to the position identified by the radio direction, and returning to tracking in which it is possible to place the object 106, which is the original tracking target, within the approximate center of the field of view.

Figure 7F:
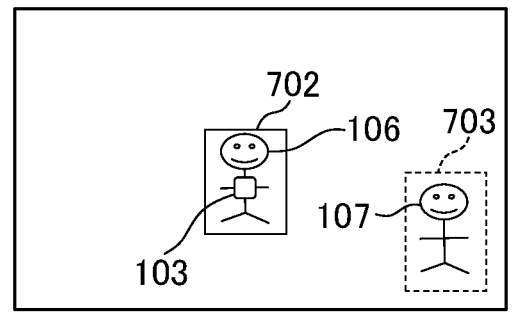

FIG. 7F shows a state in which the position identified by radio waves is set to be located at the approximate center of the angle of view in steps S507 and S504 to S506, and then the process returns to step S402, and the position identification is returned to the position identification by human body detection. That is, if, in step S507, in the network camera 101, as the result of a PT drive instruction to the position identified by radio waves, the position is located within a predetermined distance from the approximate center of the angle of view in step S506, the process returns to step S402.

Then, position identification is performed using human body detection for automatic tracking. Furthermore, in the network camera 101, the radio wave transmission interval is changed to be longer than a predetermined interval in step S403, and the battery consumption of the wireless device 103 is reduced.

As described above, according to the present embodiment, even if an object overlaps with another person and the like and erroneous tracking occurs during tracking of the object based on the video image, the position of the object 106 is identified based on the direction of radio waves from the wireless device 103 that the object 106 has.

As a result, it is possible to correct the position of the original tracking target so that the position is captured at the approximate center of the angle of view, and even if the object is temporarily lost from view and erroneous tracking occurs, the operation of tracking the tracking object can be corrected and the performance of the automatic tracking function can be improved.

Additionally, in the present embodiment, control is performed to switch to automatic tracking based on human body detection after tracking the object based on radio waves and performing the PT control so that the object is located at the approximate center of the angle of view. Therefore, PT control is performed so that the object 106 that holds the wireless device 103 is located at the approximate center of the angle of view, and then switching to position identification based on human body detection capturing around the object 106 is performed, and the accuracy in position identification with respect to the object 106 is maintained.

That is, in step S507, control is performed so that a PT drive instruction is output to the position identified by radio waves, and then, in step S406, the PT drive instruction is output to the position identified by the human body detection.

Here, steps S406 and S507 function as tracking steps for performing tracking of the object based on the positions identified by the first identifying step and the second identifying step.

Furthermore, the transmission interval at which the wireless device transmits radio waves is changed between the case in which the object is tracked by using the first identifying unit and the case in which the object is tracked by using the second identifying unit. Specifically, the transmission interval is controlled so that the transmission interval when the object is tracked using the first identifying unit is longer than the transmission interval when the object is tracked using the second identifying unit. Therefore, the consumption of the battery of the wireless device 103 can be reduced.

Additionally, although in the present embodiment, an example has been explained in which, when the object 106 overlaps with another person and then separates from them ("YES" in step S501), and, in step S502, the position identifying method is switched from human body detection to radio waves, the present invention is not limited thereto. That is, step S502 may be executed, for example, when the tracking object overlaps with another person ("YES" in step S405).

Additionally, although in the present embodiment, in step S501, step S501 is repeated until the positions of a plurality of persons are separated and PT driving is not performed during that time, the present invention is not limited thereto. PT drive instructions, as in step S406, may be periodically output to the overlapping region.

By doing so, when the positions of the persons are separated, erroneous tracking may temporarily occur, however, it is possible to prevent the persons from being out of view when they move in a state in which they overlap.

Additionally, although in the present embodiment, an example has been described in which two objects, the object 106 that is a tracking object, and the object 107 that is not a tracking object, are present, three or more objects may be present. If the human body ID of the tracking object and the device ID of the wireless device 103 are registered with each other in the management table, even if two or more persons overlap with each other, the identification of the position of the tracking object is switched from human body identification to radio waves, and if erroneous tracking occurs, it can be corrected.

Furthermore, although the wireless communication standard used in the present embodiment has been described using an example in which Bluetooth (registered trademark) version 5.1 is used, any version can be used if the direction detection function is activated. That is, even if Bluetooth (registered trademark) version 5.2 or later is used, if the direction detection function of version 5.1 is followed, the conditions of the a radio communication standard for carrying out the present embodiment are satisfied.

Alternatively, other communication methods not limited to Bluetooth (registered trademark) such as UWB, can also be used if they are wireless communication protocols and methods by which the direction of radio waves can detected based on the AoA or AoD method using a plurality of antennas as described above.

Note that, in the present embodiment, some or all of 212-1 to 212-8, which are the functional blocks, are realized by the CPU 212 installed in the network camera 101 executing a computer program, or by hardware.

However, some or all of these functional blocks may be realized by the CPU provided in the client device 102 executing a computer program, or by hardware.

Additionally, in the present embodiment, an example of exclusively switching the state of identifying the position of the object based on radio waves and the state of identifying the position of the object based on video image analysis has been explained. However, the final tracking position may be determined by performing a weighted addition on the positions obtained by both.

Then, in the case in which the object overlaps with another object and they then become separated, tracking may be performed with a relatively high weighting on the position identified based on radio waves. Then, after PT control is performed so that the object is located at the approximately center of the screen, the weighting ratio may be controlled so that the weight of the position identified based on the video image analysis is set as relatively high.

Note that, although, in the above embodiment, an example of changing the imaging direction of the imaging apparatus by PT control has been described as an example of automatic tracking, the present embodiment is not limited thereto. For example, it may be possible that, for example, a frame display corresponding to an object that is a tracking target is performed on the screen, and the frame display is tracked on the screen according to the movement of the object.

Alternatively, automatic tracking in the present embodiment includes shifting the entire screen so that the tracking object is located at the approximate center of the screen and changing a cut-out range of the image.

Additionally, although, in the image processing apparatus according to the above embodiment, an example in which humans are the tracking targets has been described, the tracking target may be specific living things or animals. Alternatively, the tracking target may be a moving object, for example, a specific automobile, flying object, or robot.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the image processing apparatus through a network or various storage media. Then, a computer (or a CPU, an MPU, or the like) of the image processing apparatus may be configured to read and execute the program. In such a case, the program and the storage medium storing the program configure the present invention.

This application claims the benefit of Japanese Patent Application No. 2022-081247, filed on May 18, 2022, which is hereby incorporated by reference herein in its entirety.

What is claimed is:

1. An image processing apparatus comprising:
a computer memory storing instructions; and
at least one processor or circuit executing the instructions causing the image processing apparatus to:
identify the position of an object that is a tracking target based on an image obtained by an imaging device;
identify the position of the object based on radio waves received from a wireless device that the object holds;
determine whether or not the object overlaps with another object in the image obtained by the imaging device;
determine whether or not a distance between the object and the another object in the image obtained by the imaging device has been separated by a predetermined distance or more; and
performs pan or tilt control for changing a direction of the imaging device to perform tracking of the object based on the identified position of the object,
wherein if it is determined that the object overlaps with the another object in the image obtained by the imaging device, and then if it is determined that the distance between the object and the another object has been separated by a predetermined distance or more in the image obtained by the imaging device, tracking of the object is performed based on the position of the object identified based on the radio waves received from the wireless device.

2. The image processing apparatus according to claim 1, wherein the predetermined distance is changed according to at least one of a zoom state of the imaging device or a distance from the imaging device to the object.

3. The image processing apparatus according to claim 1, wherein the tracking of the object is performed based on the position identified based on the radio waves received from the wireless device, and then the tracking of the object is performed based on the position identified based on the image obtained by the imaging device.

4. The image processing apparatus according to claim 1, wherein it is determined whether or not to perform tracking of the object based on the position identified based on the radio waves received from the wireless device, based on a management table in which identification information of the object and identification information of the wireless device are associated.

5. The image processing apparatus according to claim 1, wherein the at least one processor or circuit further executes the instructions causing the image processing apparatus to:

change a transmission interval at which the wireless device transmits radio waves, depending on whether the object is tracked based on the image obtained by the imaging device or the object is tracked based on the radio waves received from the wireless device.

6. The image processing apparatus according to claim 5, wherein the transmission interval is controlled so that the transmission interval in the case in which the object is tracked based on the image obtained by the imaging device is longer than the transmission interval in the case in which the object is tracked based on the radio waves received from the wireless device.

7. An image processing method comprising:
   a first identifying in which the position of an object that is a tracking target is identified based on an image obtained by an imaging device;
   a second identifying in which the position of the object is identified based on radio waves received from a wireless device that the object holds;
   a first determining in which whether or not the object overlaps with another object in an image obtained by the imaging device is determined;
   a second determining in which whether or not a distance between the object and the another object in an image obtained by the imaging device has been separated by a predetermined distance or more is determined;
   a first tracking in which tracking the object is performed based on the position of the object identified in the first identifying, and
   a second tracking in which, if it is determined in the first determining that the object overlaps with the another object in an image obtained by the imaging device, and then if it is determined in the second determining that the distance between the object and the another object has been separated by a predetermined distance or more in the image obtained by the imaging device, tracking the object is performed based on the position of the object identified in the second identifying by performing pan or tilt control for changing a direction of the imaging device.

8. A non-transitory computer-readable storage medium storing a computer program including instructions for executing following processes:
   a first identifying in which the position of an object that is a tracking target is identified based on an image obtained by an imaging device;
   a second identifying in which the position of the object is identified based on radio waves received from a wireless device that the object holds;
   a first determining in which whether or not the object overlaps with another object in an image obtained by the imaging device is determined;
   a second determining in which whether or not a distance between the object and the another object in an image obtained by the imaging device has been separated by a predetermined distance or more is determined;
   a first tracking in which tracking the object is performed based on the position of the object identified in the first identifying, and
   a second tracking in which, if it is determined in the first determining that the object overlaps with the another object in an image obtained by the device, and then if it is determined in the second determining that the distance between the object and the another object has been separated by a predetermined distance or more in the image obtained by the imaging device, tracking the object is performed based on the position of the object identified in the second identifying by performing pan or tilt control for changing a direction of the imaging device.

* * * * *